US009483875B2

(12) United States Patent
Theimer et al.

(10) Patent No.: US 9,483,875 B2
(45) Date of Patent: Nov. 1, 2016

(54) AUGMENTED REALITY SYSTEM WITH ENCODING BEACONS

(71) Applicant: Research In Motion Limited, Waterloo Ontario (CA)

(72) Inventors: Wolfgang Michael Theimer, Bochum (DE); Sebastian Gehrling, Essen (DE)

(73) Assignee: BlackBerry Limited, Waterloo, Ontario (CA)

( * ) Notice: Subject to any disclaimer, the term of this patent is extended or adjusted under 35 U.S.C. 154(b) by 344 days.

(21) Appl. No.: 13/767,380

(22) Filed: Feb. 14, 2013

(65) Prior Publication Data

US 2014/0225916 A1    Aug. 14, 2014

(51) Int. Cl.
| | | |
|---|---|---|
| G06T 19/00 | (2011.01) | |
| H04B 10/114 | (2013.01) | |
| G06F 3/01 | (2006.01) | |
| H04J 14/00 | (2006.01) | |

(52) U.S. Cl.
CPC ............. *G06T 19/006* (2013.01); *G06F 3/012* (2013.01); *H04B 10/1149* (2013.01); *G06F 2203/04806* (2013.01); *H04J 14/005* (2013.01)

(58) Field of Classification Search
CPC .................................... G01S 1/70; G01S 5/16
See application file for complete search history.

(56) References Cited

U.S. PATENT DOCUMENTS

| | | | |
|---|---|---|---|
| 6,795,041 B2 * | 9/2004 | Ogawa et al. ................ 345/7 |
| 6,912,360 B1 | 6/2005 | Sparrold et al. | |
| 8,334,901 B1 | 12/2012 | Ganick et al. | |
| 2004/0071315 A1 | 4/2004 | Neely | |
| 2004/0161246 A1* | 8/2004 | Matsushita et al. .......... 398/187 |
| 2010/0225484 A1 | 9/2010 | Van De Sluis et al. | |
| 2011/0186625 A1 | 8/2011 | Mangione-Smith | |
| 2012/0075343 A1 | 3/2012 | Chen et al. | |
| 2012/0120070 A1 | 5/2012 | Baillot | |

(Continued)

FOREIGN PATENT DOCUMENTS

WO    2012049674    4/2012

OTHER PUBLICATIONS

Salehi, Jawad, Andrew M. Weiner, and Jonathan P. Heritage. "Coherent ultrashort light pulse code-division multiple access communication systems." Lightwave Technology, Journal of 8.3 (1990): 478-491.*

(Continued)

*Primary Examiner* — Barry Drennan
*Assistant Examiner* — Richard M Russell
(74) *Attorney, Agent, or Firm* — Jeffrey N. Giunta; Fleit Gibbons Gutman Bongini & Bianco P.L.

(57) ABSTRACT

An augmented reality system with encoding light emitting beacons placed in a scene. Beacons placed at desired locations in a scene emit light modulated with multiple access encoding that conveys an identifier for its emitting beacon. The emitted light signals are also blanked for longer than a time between image capturing by an image augmenting device. Beacons viewed in captured images are identified by correlating an absence of a beacon in an image with an absence of a received identifier in received light signals. In a view of the scene presented to a user, augmenting images are obtained based upon the determined beacon identifier and are displayed at locations in the scene based upon the determined location of that beacon. Beacons that emit pulsed light signals encoded with the multiple access coding are also provided.

21 Claims, 6 Drawing Sheets

(56) References Cited

U.S. PATENT DOCUMENTS

2012/0244939 A1 9/2012 Braun
2012/0249797 A1 10/2012 Haddick et al.

OTHER PUBLICATIONS

Griner, U.N., et al., "Multiuser Diffuse Indoor Wireless Infrared Communication Using Equalized Synchronous CDMA," IEEE Transactions on Communications, vol. 54, No. 9, Sep. 2006, 0090-6778 copyright 2006 IEEE.

Ryu, N., et al., "The Invisible Augmented Reality Using the IR LED Marker," Information Engineering letters, ISSN: 2160-4114, vol. 1, No. 1, Dec. 2011. doi.10.5729/iel.vol1.issue1.45.

Naimark, L., et al., "Encoded LED System for Optical Trackers," Presented at the Fourth IEEE/ACM International Symposium on Mixed and Augmented Reality (ISMAR 2005), Oct. 5-8, 2005, Vienna, Austria.

Kato, H., et al., "Marker Tracking and HMD Calibration for a Video-Based Augmented Reality Conferencing System," Faculty of Information Sciences, Hiroshima City University, Augmented Reality, 1999. (IWAR '99) Proceedings. 2nd IEEE and ACM International Workshop, Date of Conference: 1999.

European Search Report dated Jul. 4, 2013 for Application No. 13155301.8.

\* cited by examiner

AUGMENTED REALITY SYSTEM WITH ENCODING BEACONS

FIELD OF THE DISCLOSURE

The present disclosure generally relates to visual image augmenting techniques, and more particularly to visual image augmenting techniques that include encoding beacons in natural scenes.

BACKGROUND

Augmented reality systems present a user with ambient scenes, i.e., a view of an existing scene, to which augmenting images are added either alongside the view of the ambient scenes, superimposed onto the ambient scene, or both. Various techniques that are usually computationally intensive are used to properly place and orient the augmenting images onto the ambient scenes. In some instances, an accurate determination of the position and orientation of observation point of the ambient scene is used to determine where the augmenting image is to be added for presentation to the user. In other examples, an image of the scene is analyzed to identify features in the scene in order to determine where the augmenting images are to be added.

Efficient and inexpensive techniques to determine locations and orientations at which to display augmenting images within images of a scene will benefit augmented reality systems.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
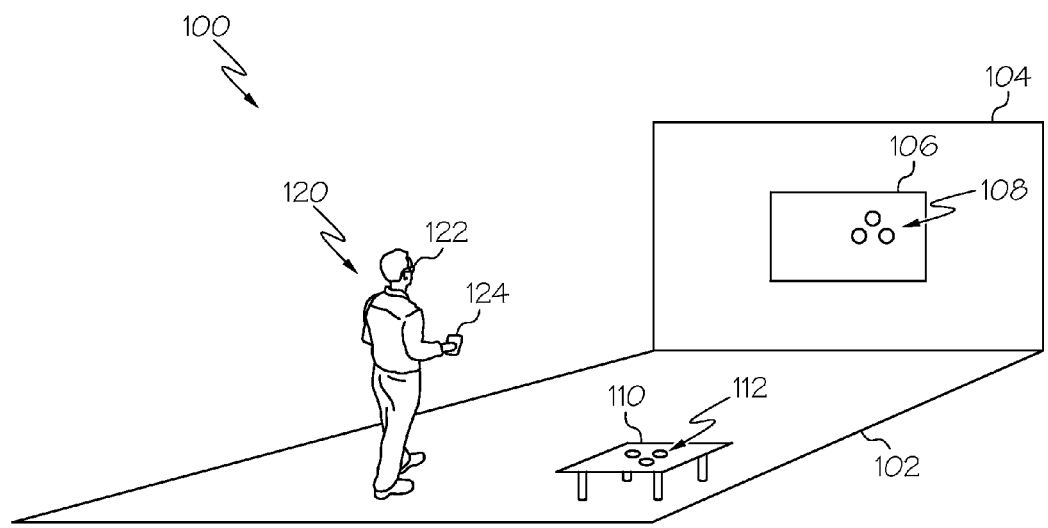
FIG. 1 illustrates an augmented reality environment, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function. In the following discussion, "handheld" is used to describe items, such as "handheld devices," that are sized, designed and otherwise configured to be carried and operated while being held in a human hand.

The below described systems and methods provide convenient, efficient and inexpensive techniques to create an augmented reality experience by adding light emitting beacons, or physical markers, to physical locations, i.e., locations within the physical space being viewed as an ambient scene onto which augmenting images are to be added by superimposing or by otherwise being adding through the processing of an image augmenting device, such as an augmented reality viewing device. The beacons in one example are light emitting physical devices that are small, battery powered devices. Each beacon is configured with a number of light emitters, such as Light Emitting Diodes (LEDs), where the light emitters are arranged in a pattern on the body of the beacon device. The beacons in one example include three infrared (IR) LEDs that are arranged in a triangular configuration. In further examples, beacons include any number of light emitters, such as one, two, four or more light emitters where multiple emitters of each beacon are arranged in a pattern that is recognizable by processing an image of the beacons. These emitters are able to emit infrared light, visible light, or light emissions in any part of the light spectrum.

The image augmentation system of one example includes a camera or other image capturing device that captures images of the view that is observed by a user of the image augmentation system. The physical location and orientation of images of the one or more beacons within the ambient image viewed by a user are able to be determined by processing captured image of the ambient scene. Based on a known relationship between the view of the camera or other image capturing device that captures images of the ambient scene, and the view of the ambient scene that is presented to a user by the image augmentation system, an augmented reality is able to be created by superimposing augmenting images at defined simulated physical locations relative to beacon images that are identified in the ambient scene viewed by the user.

The images that are superimposed onto a view of the ambient scene, which are referred to in this description as "augmenting images," are able to include stored images, images created by a processor, or combinations of these. Images created by a processor are able to include, for example, animations, representations of data such as graphs and charts, still or moving pictures, any other type of image data, or combinations of these. These augmenting images are also able to be modified so as to create versions of the augmenting images that are suitable for the particular view of the ambient scene being presented to the user. For example, the augmenting image is able to be modified so as to appear as though it is being viewed from a different angle when it is superimposed onto a view of the ambient scene. Creating a projection of an image so as to create a view of that image that corresponds to a view from a different angle, which is referred to herein as a "view angle," is a known image processing technique. In some examples, the augmenting image is modified to have a different view angle based upon a determined orientation of the light emitters of a beacon relative to the image capturing device.

In one example, an image of an ambient scene is analyzed and identifies an image of a beacon that has three light emitters that are arranged in a defined arrangement. Analysis of the identified image of the beacon may determine that the observation angle of the beacon as observed by the user is not a right angle, i.e., the user's view of the beacon is not along a line of sight that is perpendicular to a plane formed by the three light emitters of the beacon. Based upon the determined observation angle that the user has of the beacon, an augmenting image to be added at a location in the image of that beacon is able to be modified to have a view angle corresponding to the observation angle that the user has of that beacon. In further examples, the augmenting images are added to the ambient scene without modification based upon a determined observation angle of the beacon that indicates the location in the image at which the augmenting image is to be added.

In one example, the beacons operate to emit beacon identification data that is encoded by means of modulating the light emitted by the beacons. For example, the light emitters in a beacon are able to flash on and off in a pattern that corresponds to a defined data pattern. Configuring different beacons to emit different patterns of flashing light operates to allow, for example, an observing device to determine an identity of a beacon. In some examples, the emitted light is pulsed in an on-off pattern with a high rate of speed so as to convey digital data. These emitters in one example are also able to be configured to "blank" for a blanking time interval during which no light is emitted. In one example, the blanking time interval corresponds to a time interval between times at which images of the ambient view are captured by an image augmenting device. When a beacon is "blanked," the image of emitted light of that beacon is missing from images captured during the blanking time interval and beacon identification data conveyed by the emitted light is also missing. The absence of an image of that beacon in a captured image is used in one example to correlate the image of the beacon with the lack of emitted beacon identification data at the time the image is captured in order to identify the beacon corresponding to beacon images in captured images, as is described below.

In one example, the below described systems include an image augmenting device that includes a photo-detector that receives light from within a view angle that corresponds to the field of view of the ambient image that is viewable through the image augmenting device. The photo-detector is configured to detect light in the spectrum emitted by the beacons that are located in the ambient scene and within the view angle. In one example, the photo-detector produces one received light intensity data value that indicates the intensity of all light within a defined spectrum that is received by the photo-detector within the view angle over a sample period. In such a configuration, the photo-detector is able to receive light pulses from all beacons that are within the field of view of the image augmenting device and produce a time sequence of light intensity data that indicates the combined intensity of light received from all beacons within the view angle of the photo-detector. In one example, each value in the time sequence of light intensity data represents the sum of light intensities received at the photo-detector from all beacons within that view angle during a sample period for that value. In order to properly determine the identity of the individual beacons within the view angle of the ambient image that is viewable through the image augmenting device, the beacons in one example utilize a multiple access signal transmission scheme that allows processing of the output of the photo-detector to determine the identification of each beacon that is emitting light within the view angle of the ambient image. In one example, the beacons are configured to emit unique beacon identification data that is associated with only that beacon by emitting light that is modulated with a Code Division Multiple Access (CDMA) spectrum spreading pattern that is unique to that beacon.

In one example, the modulated light emitted by each beacon is further encoded with data that includes various data items associated with the beacon. The data is able to include, for example, a beacon identifier such as an identification number or other identification data, geographical location information such as latitude and longitude, data related to the location of the beacon such as altitude information, present temperature information at the beacon or elsewhere, data containing or specifying other information, data that defines or identifies augmenting images to be used by an image augmenting device, or combinations of these data. In some examples, the data is able to include data that is incorporated into an augmenting image, such as the ambient temperature measured at the beacon. For example, an augmenting image is able to be created that incorporates the numerical data, such as ambient temperature, that is conveyed in the data encoded onto the emitted light.

In one example, the modulated light emitted by a beacon is able to be encoded with data that includes augmenting image identification data that identifies augmenting images or other information to be presented in conjunction with the view of the ambient scene. For example, the beacon is able to send data that includes a Universal Resource Locator (URL), where the data is encoded onto a unique CDMA spectrum spreading code that is modulated onto the emitted light. That URL in one example refers to an image, video, text information, graphical information, other data, or combinations thereof, that is to be presented within the augmented view of the ambient scene at the location in the view of the ambient scene related to a location of an image of that beacon. In one example, the data emitted by the beacons is not itself used to augment the ambient scene image, but rather identifies an address or other indicator of data to be used. Configuring the beacons to emit data that merely identifies data to use to augment an image facilitates changing the augmented image at will since the stored data indicted by the beacons is used to augment the image. Further, accessing the indicated data can include providing identifying data about the viewer for whom the augmentation data is to be used. This allows personalization of the augmenting image data presented to the user viewing the augmented ambient scene. In further examples, the beacon is able to be encoded with data that includes the augmenting image data itself.

In one example, the photo-detector responds to light intensity variations that correspond to, for example, receiving light modulated with a high modulation rate or bandwidth. For example, the time sequence of light intensity data includes light intensity samples that indicate light intensities received over very short time durations that correspond to, for example, a modulation rate of data encoded onto the light emitted by the beacons. Such photo-detectors are able to demodulate high bandwidth data that is modulated onto the light emitted by the beacons. Such photo-detectors respond to rapidly varying light intensity levels and allow a high data signaling rate to be modulated onto the light emitted by the beacons. These beacons are therefore able to efficiently emit relatively large amounts of data, employ multiple access spectrum spreading code modulation formats such as CDMA encoding, or both. In instances of using CDMA encoding, using a high spectral spreading code rate allows many beacons to be located in a viewing angle and processing of a time sequence of detected light intensity data is able to identify each beacon in the view angle based on data received over a relatively short time duration.

A time sequence of light intensity data detected by the photo-detector indicates the light intensity emitted by objects in the view angle that is received by the photo-detector. The emitted light intensity for each beacon includes data defining beacon identification data that identify the beacons within the view angle of the image augmentation device. In one example, the physical location of the beacons within the view angle of the ambient image is determined by capturing images of objects within the view angle and processing those captured images to identify the location of images of the beacons within the captured images. The beacon identification data received by the photo-detector is then correlated with each image of a particular beacon within the captured images by various techniques.

In some examples, the beacons are configured to "blank" for a duration that is longer than the anticipated period between capturing images by the image capturing device of an image augmenting device. In such examples, an image of one beacon will be absent in some of the captured images when compared to the images of beacons that are identified in other captured images. The beacon identification data for that "blanked" beacon will also be absent from the beacon identification data determined by processing the detected light intensity during the period when that image was captured. One example stores the locations of observed beacon images within captured images and the beacon identification data determined by processing the detected light intensity received from the view angle for a sequence of time intervals. The identification of a particular beacon in a field of view is based upon the absence of a particular beacon's image from a captured image and the concurrent absence of beacon identification data for that particular beacon during times proximate to the time when that image is captured.

In one example, images of the field of view are able to be captured at a slow rate because the content of data communicated by the pulsing of the light emitted by the beacons is determined by the photo-detector and not based upon analysis of a time sequence of images that determines the on-off pattern of the light emitted by the beacons. Such processing advantageously allows high optical signaling rates to be used by the beacons' emitters while slower speed, and lower cost, image capturing and processing hardware is able to be used to capture and process images to determine the locations of the beacons within a field of view of the observing device.

In one example, the image augmentation device is able to be an easily worn head-mounted display device which in one example has a physical appearance that is similar to a pair of eyeglasses. In one example, a head-mounted display device has viewports where each viewport has an ability to superimpose, or otherwise present, augmenting images with a view of an ambient scene that is viewed through the viewport. In one example, the head-mounted display device is able to have two viewports that are each optical windows that have an appearance similar to conventional eyeglass lenses but that operate to present independent augmenting images to each viewport, thereby creating a simulated three-dimensional presentation for the wearer or user of the head mounted display device. Further image augmentation devices operate by presenting a user with an image of the ambient scene that is captured by a camera or other image capturing device and to which augmenting images are added. Such further image augmentation devices are able to be head mounted devices, handheld devices, devices that are fixedly mounted to a structure, vehicle or other mounting point, or have other suitable forms.

FIG. 1 illustrates an augmented reality environment 100, according to an example. The augmented reality environment 100 depicts a physical environment in which a user 120 of an image augmentation system is located in an environment in which a number of light emitting beacons are disposed. In the illustrated example, the user 120 is standing on a ground surface 102 such as a floor, sidewalk, or other surface. The user 120 is wearing an image augmentation headset 122 that is an example of part of an image augmentation device that has a physical appearance similar to a pair of glasses. The image augmentation headset 122 is described in further detail below and includes a viewport for each eye of a person wearing, or otherwise using, the image augmentation headset 122. In one example, the viewports appear similar to conventional eyeglass lenses and allow the user 120 to look through the viewports to view his or her surroundings. An image of a user's ambient surroundings, as is viewed by the user 120 through the one or more viewports of the image augmentation headset 122, is referred to herein as an ambient image.

Although the described examples depict an image augmentation device in the form of a head-mounted component, any display device that allows a person to see ambient images, or images of a scene, into which augmenting images are added is able to be configured and operate in a manner similar to that described below. Further examples include image augmenting devices that are not worn, but may be otherwise mounted so as to facilitate a user looking through one or more viewports.

As described below, the image augmentation headset 122 has image capturing devices and light sensors that operate to capture images and detect light within the view of the viewports of the image augmentation headset 122. One or more light sensors on the image augmentation headset 122 detect light intensity received from with a view angle of the image augmentation headset 122, where the detected light intensity includes light pulses emitting from, for example, beacons that are placed within the view of the image augmentation headset 122. In one example, a view angle of an image augmentation headset corresponds to the field of view that is able to be observed through the viewports of the image augmentation headset 122. As the image augmentation headset 122 moves, such as by movement of the wearer's head or other movements, the view of the image augmentation headset 122 correspondingly changes.

The image augmentation headset 122 of one example operates to augment the ambient image viewed by the user 120, such as by superimposing an augmenting image onto the ambient image viewed by the user 120. In the illustrated example, the user 120 is holding an electronic device 124 that exchanges data with the image augmentation headset 122. In one example, the electronic device 124 is a portable electronic device such as a cell phone or other handheld electronic device. In general, any electronic device is able to perform the processing described below for the electronic device 124.

The electronic device 124 is an example of an augmenting image generation processor that receives time sequences of light intensity data and captured images of objects from within the view angle, and based in part upon that data produces and sends data defining augmenting images to the image augmentation headset 122. The augmenting images produced by the electronic device are added to the ambient image viewed by the user 120 to present the user 120 with an augmented image. In one example, the augmenting images are superimposed over a portion of the ambient image the user 120 sees through the viewports of the image augmentation headset 122.

The augmented reality environment 100 depicts two light emitting beacons located in the environment of the user 120. A wall 104 has a window 106 in which a first beacon 108 is located. The augmented reality environment 100 further includes a table 110 that has a second beacon 112 located thereon. In one example, the first beacon 108 and the second beacon 112 emit light pulses in a pattern that is unique to each beacon, thereby allowing the individual beacons to be identified. As illustrated, the first beacon 108 and the second beacon each has a body onto which are mounted a number of light emitters.

An image capturing device that is part of the image augmentation headset 122 captures images of the view that includes the beacons. As depicted in the augmented reality environment 100, each beacon has three light emitters positioned in a triangular arrangement with each other. This arrangement allows image processing of an image capturing the beacons to identify the orientation of the beacon.

In one example, the image augmentation headset 122 receives augmenting image data from the electronic device 124 and operates to superimpose the received augmenting images at locations within image of the ambient view that correspond to locations of images of the beacons detected within the ambient view. Such superposition processing produces an effect whereby the augmenting images are appear to the user 120 at or near a physical location of the beacons, such as the first beacon 108 and the second beacon 112, in real space.

In further examples, one or more beacons are able to have fewer than three light emitters. Processing of images of beacons that have only one light emitter is generally not able to determine the orientation of the beacon with respect to the image capturing device, but the beacon is able to emit modulated light that conveys data associated with augmenting images to be used to augment the ambient view. Processing of images of beacons that have only two light emitters may be able to provide limited orientation data, but those beacons are also able to emit modulated light that conveys data associated with augmenting images to be used to augment the ambient view. In yet further examples, beacons are able to have four or more light emitters. Such beacons are able to mount those four or more light emitters with any three dimensional pattern on, in, or near the body of the beacon.

Figure 2:
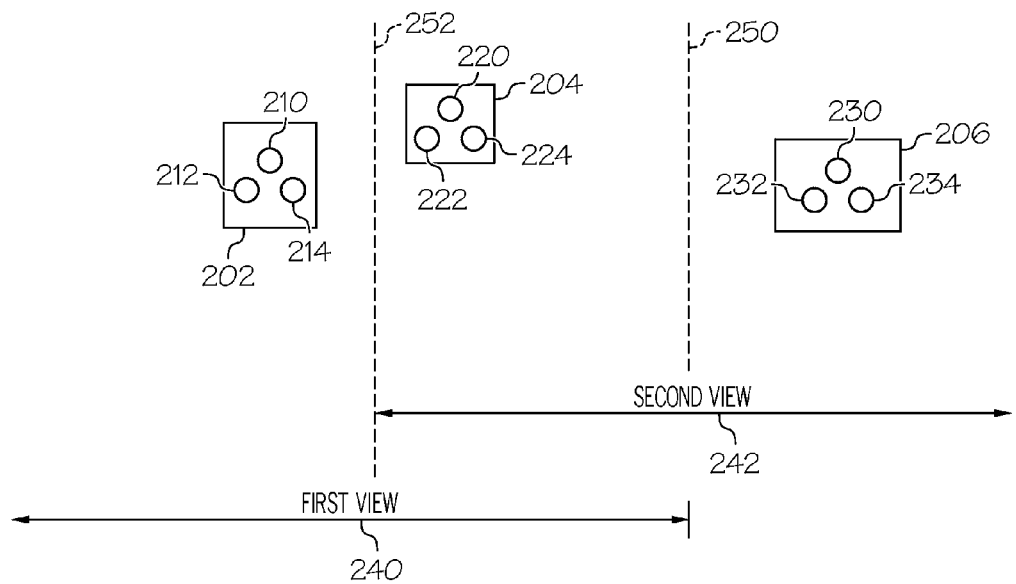
FIG. 2 illustrates a three beacon arrangement, according to one example.

FIG. 2 illustrates a three beacon arrangement 200, according to one example. The three beacon arrangement 200 depicts a first beacon 202, a second beacon 204, and a third beacon 206. The three beacon arrangement 200 depicts two views, a first view 240 and a second view 242. The first view 240 illustrates a view that a user of an image augmenting headset, such as the above described image augmenting headset 122, sees when the headset is in a first orientation. The second view 242 illustrates another view that the user sees when the image augmenting headset is in a second orientation. In the illustrated example, the second orientation provides a view that is to the right of the view provided by the first view 240. A view of a scene observed by a user wearing an image augmentation headset is able to change from the first view 240 to the second view 242 by, for example, the user's moving his or her head to the right.

The first beacon 202 is shown as a body onto which three light emitters are physically configured in a defined pattern. The three light emitters of the first beacon 202 include a first beacon first emitter 210, a first beacon second emitter 212, and a first beacon third emitter 214. These three emitters are physically configured in a defined pattern on the body that is a triangular arrangement. In one example, each beacon emits a unique sequence of light pulses that are used by a receiver to identify the beacon. A beacon is able to configure all light emitters to simultaneously emit light during these pulses. In further examples, fewer than all light emitters are able to be configured to emit light at one time, by sequencing or otherwise selecting which light emitter is to emit light for a particular pulse. The second beacon 204 similarly has a second beacon first emitter 220, a second beacon second emitter 222, and a second beacon third emitter 224. The third beacon 206 also has a third beacon first emitter 230, a third beacon second emitter 232, and a third beacon third emitter 234. In further examples, each beacon is able to have one or more light emitters. For example, some beacons are able to operate with only one light emitter, with two light emitters, or with four or more light emitters.

The light emitters in one example are configured to emit light pulses by configuring the light emitters to emit light at a first intensity level for a first time interval that is followed by emitting light at a second intensity level for a second time interval. In one example, the second intensity level corresponds to not emitting light. In further examples, the second intensity level is a lower intensity level than the first intensity level. The first time interval and the second time interval in one example have substantially equal time durations. In further examples, the first time interval and the second time interval are able to be unequal with either the first time interval or the second time interval being longer than the other.

The light emitters in one example are Light Emitting Diodes (LEDs) that are configured to emit infrared (IR) light. In such an example, an observer does not see or notice the light emitters of the beacons, but a light sensor or image capturing device is able to detect the infrared emissions and detect the presence and locations of these light emitters within captured images without affecting the view of the scene observed by a user. In further examples, beacons are able to emit light in the human visible part of the electromagnetic spectrum, light in other parts of the electromagnetic spectrum, or in combinations of these parts of the electromagnetic spectrum.

In one example, the beacons are configured to emit unique light pulse patterns that allow individual beacons to be identified from a light intensity time sequence that includes detected pulses from a number of beacons. For example, a Code Division Multiple Access (CDMA) technique is able to be used that assigns a unique spreading code to each beacon, where each spreading code has low cross-correlation characteristics with the spreading codes assigned to other beacons. A single light detector, such as a photodiode, is able to sense the light pulses emitted by multiple beacons in such an example and a correlation process is performed on the time sequence of detected light intensities to identify the presence of light pulses that correspond to individual beacons.

In one example, a controller is configured to drive the light emitters of a beacon to emit light that produces a CDMA emission that allows the emitted CDMA code to be identified from within a detected light intensity pattern that includes multiple CDMA emissions. In one example, a controller drives the light emitters to emit light at a first intensity level for a first plurality of time intervals and to also drives the light emitters to emit light at a second intensity level for a second plurality of time intervals where the first plurality of time intervals are interleaved with the second plurality of time intervals. The duration of each time interval in the first plurality of time intervals and the duration of each time interval in the second plurality of time intervals corresponds to the light emitters emitting a defined multiple access spectrum spreading code. In one example, the first plurality of time intervals and the second plurality of time intervals cause the light emitters to emit light modulated with a defined data pattern. In one example, an "on-off" modulation is used to cause the light emitters to emit an "on" symbol during the first plurality of time intervals, and to emit an "off" symbol during the second plurality of time intervals. In further examples, different modulation formats are able to be implemented by changing the intensity of emitted light between the intensity emitted during the first plurality of time intervals and the second duration of time intervals.

In one example, the controller further drives the light emitters to "blank," or to emit light at a low level, for a blanking time interval, where the blanking time interval is a defined time interval that is separate from any time interval in the first set of time intervals or the second set of time intervals. The controller in one example configures the light emitter to emit a blanking intensity level during the blanking time interval. A blanking intensity level is a light output level that is low enough to cause the light emitter to not be detected by an image capturing device, such as a camera. In one example, the blanking time interval corresponds to a time interval between image captures of an image augmenting device.

The light pulses emitted by the individual beacons are able further encode, in addition to the above described spreading code, data that includes data, such as augmenting image identification data. The time intervals within the first set of time durations and the second set of time durations are able to be adjusted to encode this data onto the multiple access spectrum spreading code emitted by the light emitters. In one example, augmenting image identification data conveyed encoded onto the CDMA code controlling the light pulses emitted by a beacon is able to include a Universal Resource Locator (URL) that contains an image, movie, text, or other data that is to be superimposed on an image of a scene at or near the location of an image of that beacon in the augmented image presented to a user.

When an image augmenting headset is oriented so as to have the first view 240, a light sensor that is configured to detect light intensity emitted from objects within that view will detect light pulses emitted by the first beacon 202 and the second beacon 204. Processing of a time sequence of light intensities emitted from objects within the first view 240 will identify the first beacon 202 and the second beacon 202 as being present in that view. Light pulses emitted by the third beacon will not be detected because it is not located within the first view 240.

When the orientation of the light sensor changes to the second view 242, processing of the time sequence of detected light intensities emitted from within the second view 242 will identify the presence of the second beacon 204 and the third beacon 206, but not the presence of the first beacon 202. In one example, the beacons are configure to "blank" for a time duration that is longer than the expected time duration that is longer than the expected time between capturing of images of the field of view of the image augmenting device. In such an example, the image of one beacon, such as the second beacon 204, will be absent in the captured image, and the beacon identification data for the second beacon 204 will also be absent from the data determined by processing the time sequence of detected light intensities. Based upon the absence of both of these data items, the processing of one example associates the beacon identification data that is missing from the processing of the time sequence of detected light intensities is associated with the second beacon, whose image is absent from the captured image.

Figure 3:
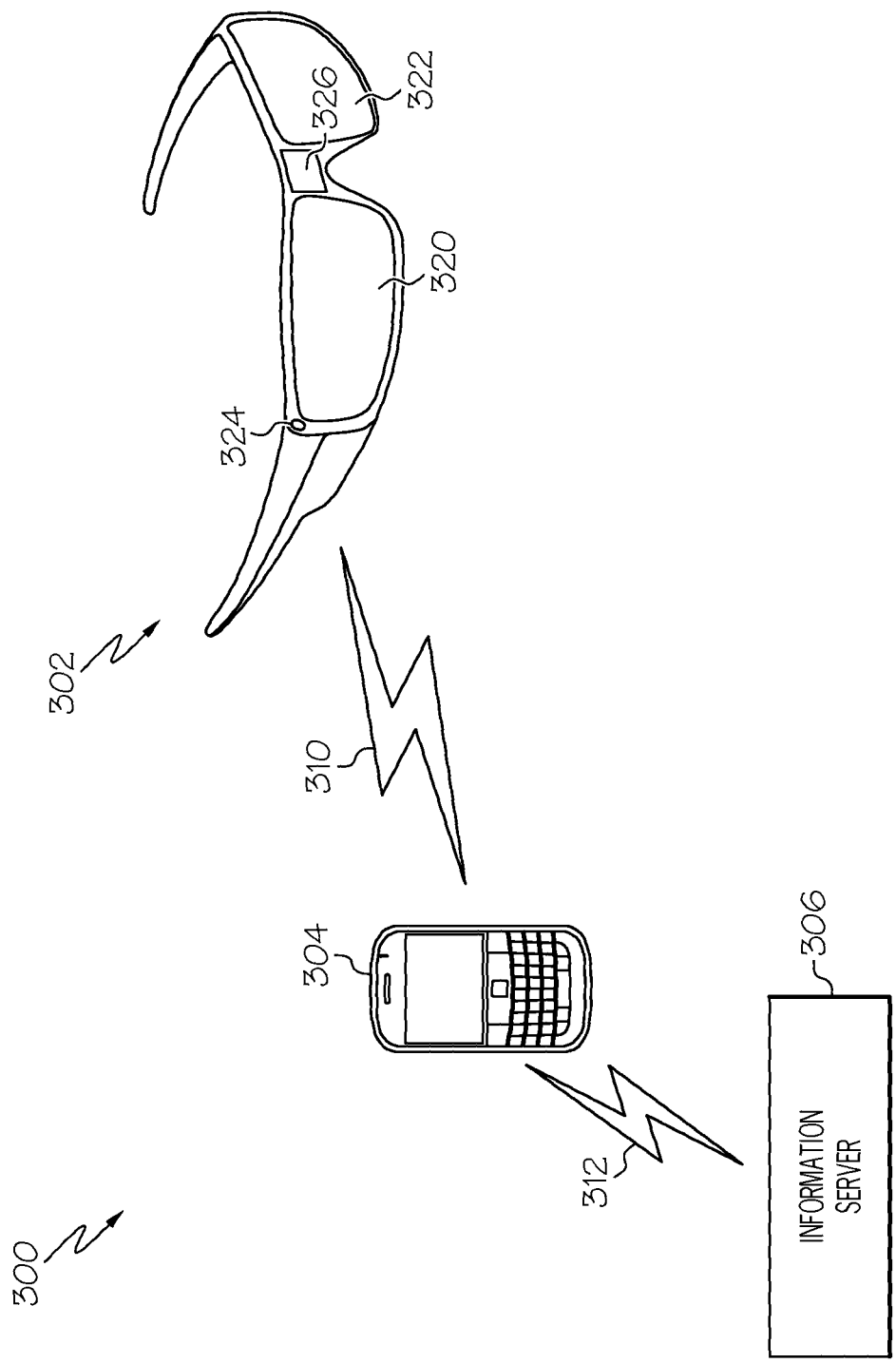
FIG. 3 illustrates an image augmentation system, according to one example.

FIG. 3 illustrates an image augmentation system 300, according to one example. The image augmentation system 300 includes components that are similar to components described above with regards to the augmented reality environment 100. The image augmentation system 300 includes an image augmentation headset 302, an electronic device 304, and an information server 306. The image augmentation headset 302 is an example of an image augmenting device that is shown to be in wireless data communications with the electronic device 304 through a first wireless data link 310.

The illustrated image augmentation headset 302 has a shape and configuration similar to a pair of glasses. The illustrated image augmentation headset 302 includes two viewports, which are optical windows in the form of a right lens 320 and a left lens 322. In the illustrated example, the left lens 322 is a first viewport that is configured to be positioned in front of a user's first, or left eye, and the right lens 320 a second viewport that is positioned in front of a user's second, or right eye. In one example, the left lens 322 and the right lens 320 are separate viewports that allow a user or wearer wearing the image augmenting headset 302 to look through those lenses and observe an ambient image on the other side of those lenses. In a further example, one or both of the left lens 322 and the right lens 320 are able to be configured to not pass light or to be translucent and therefore do not allow a wearer to clearly view an ambient image through those lenses.

One or both of the left lens 322 and the right lens 320 are able to be located in part of the field of view of a wearer such that the wearer is able to unobtrusively view ambient images around that lens. For example, the image augmentation headset 302 includes only one lens through which a wearer is able to look through with only one eye, or alternatively is positioned and sized such that a single lens is in front of both eyes and the wearer looks through the one lens with both eyes. In general, one or more viewports or lenses are able to be mounded on any suitable support that positions the one or more viewports or lenses in front of the wearer's eyes. The one or more viewports or lenses are able to be mounted to a support that is warn on or positioned near a person's head, or the one or more viewports or lenses are able to be mounted on any structure that positions the viewports or lenses close to a person's eyes. The lens or lenses of various examples are able to have neutral optical properties, such as no focus shifting or magnification properties (i.e., they are able to be non-prescription lenses) or one or more lenses are able to have focus shifting, spectral filtering, other optical characteristics, or combinations of these.

The image augmentation headset 302 includes a light sensor 324 and a camera 326. The light sensor 324 in one example is a photo-detector, such as a photo diode, that senses light received from a particular direction and produces an output, such as a voltage level, that corresponds to the detected light intensity. In one example, the light sensor 324 includes optics that limit the light detected by the light sensor 324 to only include light emitted or reflected by objects within a view of the image augmentation headset 302. The light sensor 324 is also able to be configured to detect light within a particular electromagnetic spectrum, such as only infrared light, only ultraviolet light, only visible light, light within other parts of the electromagnetic spectrum, or combinations of these.

The camera 326 is an example of an image capturing device that is used to capture images within the view of the image augmenting headset 302. The optics of the camera 326 in one example causes the captured images to correspond to a view angle defining the view of the image augmenting headset 302. The camera 326 in one example captures a time sequence of images of objects within the view angle that defines the view of the image augmenting headset. The images captured by the camera 326 and the light intensities detected by the light sensor 324 are provided to the electronic device 304 through the first wireless data link in this example. The images and light intensities are able to be provided in any format, such as raw measurements, as data subject to various data compression techniques, as reduced data, or combinations of these.

The illustrated camera 326 is shown as part of the image augmenting headset 302. In further examples, a remote camera or other image capturing device (not shown) that is separate from the image augmenting headset 302, but that has a known physical location and viewing angle relative to the image augmenting headset 302, is able to be used to capture an image of objections within the view of the image augmenting device. In such examples, the distance and orientation between the image augmenting headset 302 and beacons within the view of the image augmenting headset 302 is able to be determined based upon a known physical relationship between the remote camera or other image capturing device and the image augmenting headset 302.

In one example, the image augmentation headset 302 communicates data to the electronic device 304 that describes the view of a user of the image augmentation headset 302, and the electronic device communicates augmenting image data to the image augmentation headset 302. For example, a processor within the electronic device 304 uses the first wireless data link 310 to exchange data with an light intensity detector, such as the above described light sensor 324, and the image capturing device, such as the above described camera 326. The electronic device 304 in one example further provides at least one augmenting image that is to be inserted at a location within an ambient image that is viewed by a user of the image augmenting headset 302. The electronic device 304 in one example sends the provided augmenting images to the image augmenting headset via the first wireless data link 310. In one example, providing an augmented image includes electronically delivering data defining the image to another component, and also includes displaying, projecting, transmitting, showing or otherwise furnishing the image in any format to a user or a component.

In one example, the first wireless data link 310 is able to be a short range wireless data link, such as is implemented by a Bluetooth wireless link or other wireless data communications protocols. In further examples, the image augmentation headset 302 is able to communicate with the electronic device 304 by a wired data link, or by other data communications techniques.

The electronic device 304 exchanges data with an information server 306 over a second wireless data link 312. The second wireless data link is able to be any type of wireless data link, including a relatively short distance data networking link such as Wi-Fi®, or wider range wireless data links such as a regional cellular data network. The information server 306 is able to store or produce data defining images or other data to be used to augment a ambient view that is observed by a user of the image augmentation headset 302. For example, augmenting image identification data sent by a beacon is able to include a URL or other address from which augmenting image data is to be retrieved. The electronic device 304 detects the URL or other address and uses that data to communicate with the information server 306. The electronic device 304 sends a request to the information server 306 and the information server 306 retrieves the image or other data associated with the URL. The information server 306 communications the retrieved image or other data to the electronic device 304 over the second wireless data link 312. In various examples, the retrieved image or other data is able to include one or more images, one or more videos, textual information, graphical information, or combinations of these. The electronic device 304 formats the image or other data for presentation to the user wearing the image augmentation headset 302, and sends the data to the image augmentation headset 302 for presentation to the user, such as by superimposing the image or other data onto the ambient view observed by the user.

In one example, the image augmenting headset is able to be configured with an image augmentation device identification. An image augmentation device identification in one example is an identification code that identifies the image augmentation device, such as the image augmenting headset 302. In various examples, the image augmentation device identification is associated with a particular user to whom the device is registered. For example, the information server 306 is able to maintain a database of image augmentation device identification values and users to which each device with an image augmentation device identification is registered. In one example, a processor in the electronic device 304 retrieves augmenting images based upon sending the image augmentation device identification to the information server by including an image augmentation device identification when requesting augmenting images from the information server 306 specified by an address contained within augmenting image identification data transmitted by the beacons. For example, a processor within the electronic device 304 retrieves augmenting image by submitting a query to the information server 306 that includes the image augmentation device identification is as a parameter of the URL that is contained within an augmenting image identification received from the beacon. In further examples, the image augmentation device identification is able to be combined with image a URL or other address in any manner. Including image augmentation device identifications with requests for augmenting image data allows individualized augmenting images to be provided to each user, or sets of users.

Figure 4:
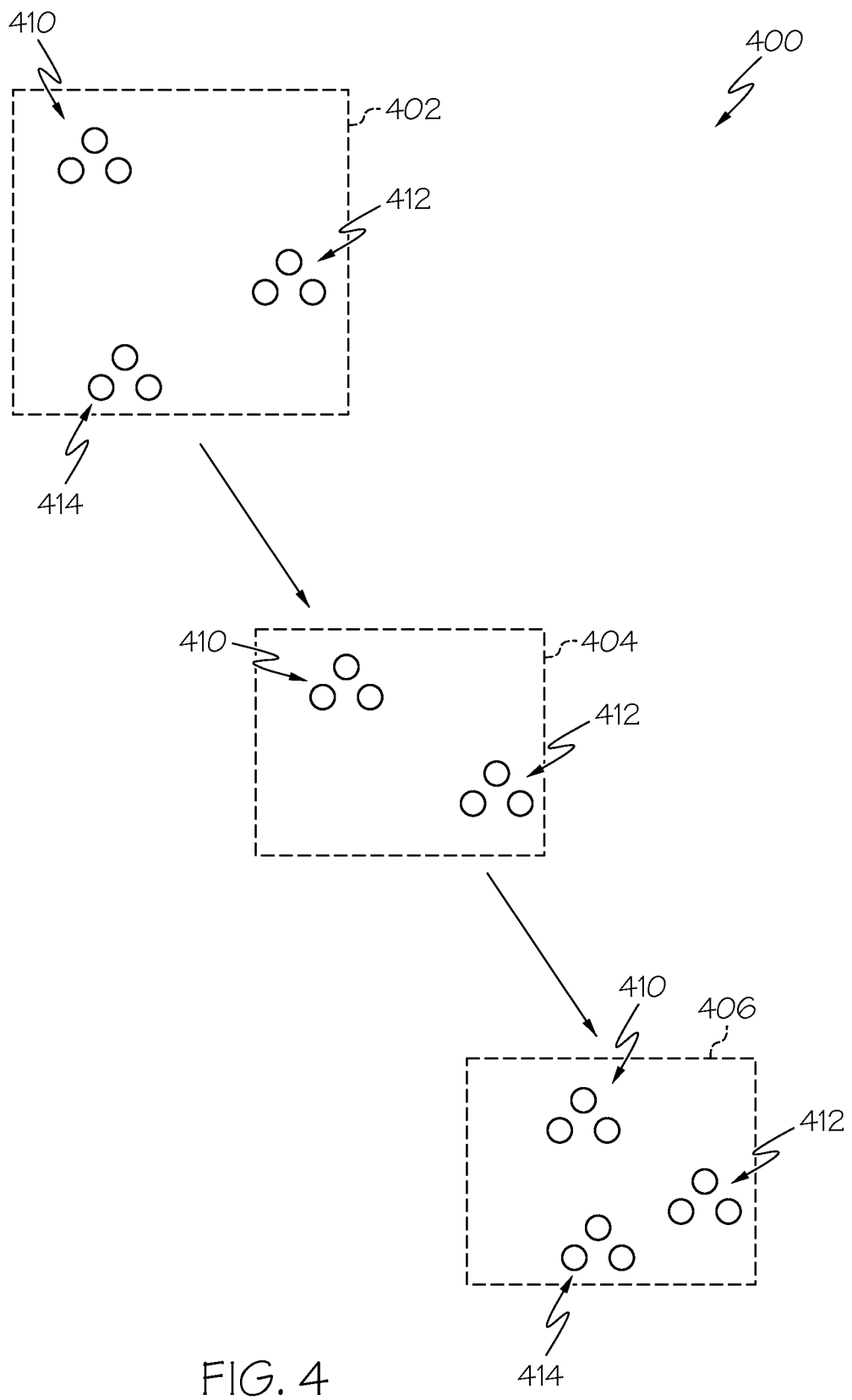
FIG. 4 illustrates a time sequence of captured images, according to one example.

FIG. 4 illustrates a time sequence of captured images 400, according to one example. The time sequence of captured images 400 illustrates a time sequence of three (3) images, a first image 402, a second image 404, and a third image 406.

In one example, the time sequence of captured images 400 depicts images that are captured at times separated by a defined time interval. For example, the second image 404 is able to be captured three seconds after the first image 402 and the third image 406 is able to be captured three seconds after the second image 404. In various examples, images are able to be captured at uniform time intervals, or the images are able to be captured at times that are separated by different time intervals.

The first image 402 depicts an image of a first beacon 410, an image of a second beacon 412, and an image of a third beacon 414. As described above, each beacon has three light emitters that turn on and off at rapid intervals to communicate data to a light receiver. In addition to the rapid on and off patterns used to communicate data, the beacons operate to "blank" at various times wherein the beacon does not emit light for a time duration that is longer than the time between the capturing of images by an image capturing device.

The second image 404 depicts an image of the first beacon 410 and an image of the second beacon 412. An image of the third beacon is absent in the second image 404 because that beacon has "blanked" at the time the second image was captured. During the time of capturing the second image 404, the identification data for the third beacon is also absent from the data received as varying light intensity from the beacons within the view of the image augmentation device because the third beacon was not emitting any light during that period.

The third image 406 again depicts the first image 402, the second image 404, and a third image 406. The third beacon is again emitting light at the time the third image 406 is captured. During this interval, identification data for the third beacon is again present in the data received as varying light intensity from the beacons within the view of the image augmentation device because the third beacon is again emitting light.

The absence of the image of the third beacon 414 in the second image 404, along with the absence of beacon identification data during that time interval, is used to correlate that beacon identification data with that beacon image. In one example, augmenting image data conveyed by the light emitted by the third beacon is placed into the ambient image at a location related to the location of the image of the third beacon 414.

Figure 5:
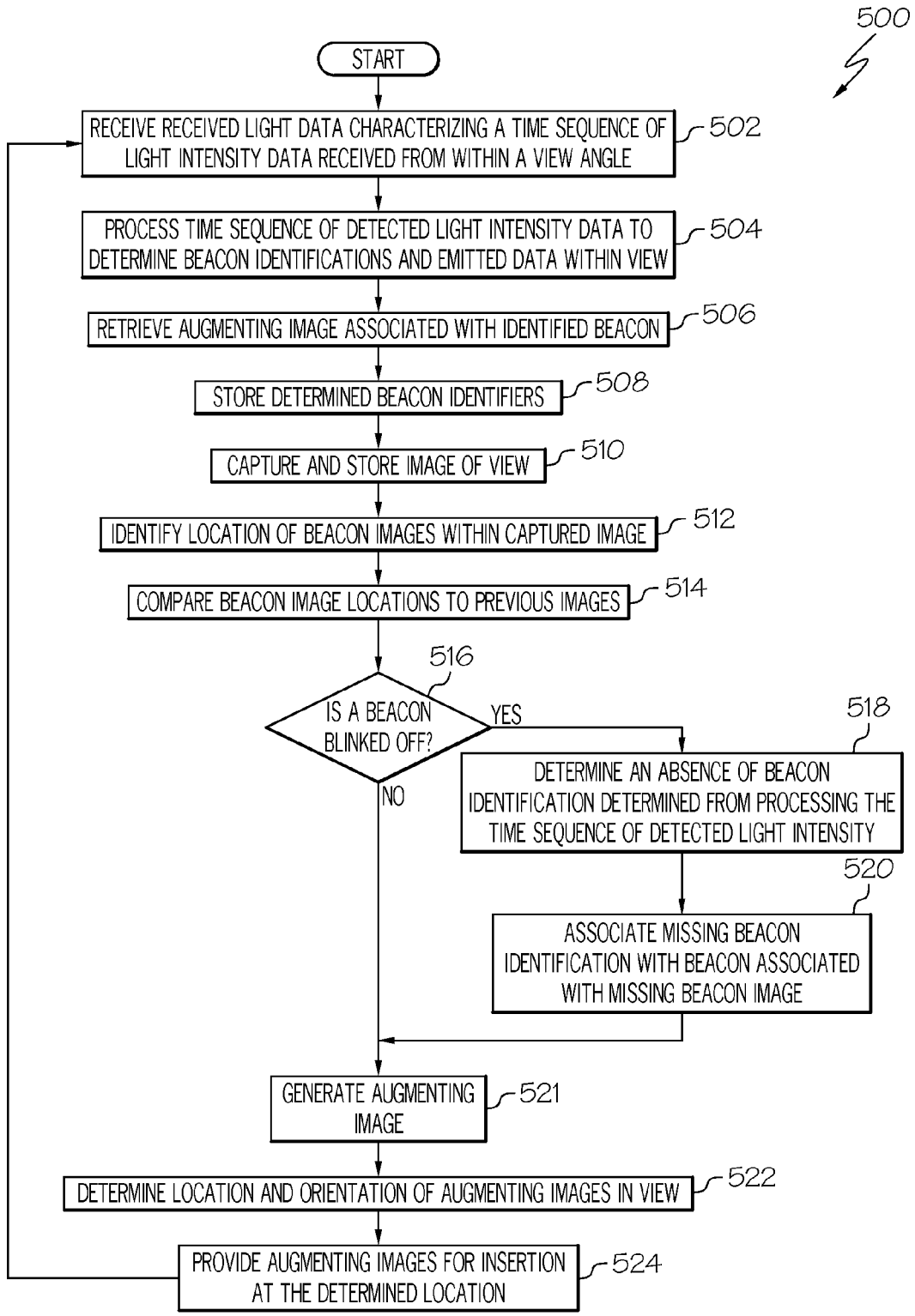
FIG. 5 illustrates a beacon identification and image augmenting process, according to one example.

FIG. 5 illustrates a beacon identification and image augmenting process 500, according to one example. The beacon identification and image augmenting process 500 is an example of a method performed by a processor within an image augmenting system, such as the above described image augmenting system 300. In one example, the beacon identification and image augmenting process 500 is performed by a processor within the electronic device 304. In further examples portions of the beacon identification and image augmenting process 500 are performed by a processor within the image augmenting headset 302 while other portions are performed by a separate processor within the electronic device 304.

The beacon identification and image augmenting process 500 process begins by receiving, at 502, received light data that characterizes a time sequence of detected light intensity data with a view of an image augmentation device. As described above, an image augmentation device operates to provide a user with a view of an ambient scene to which augmenting images are added. In one example, a photo-detector is arranged to detect light intensity levels that are directed to the image augmentation device. A time sequence of detected light intensity data is produced by such a photo-detector in one example. In one example, the light intensities are detected by the photo-detector of an image augmenting headset 302 and received light data describes the time sequence of light intensity are communicated to the electronic device 304 over the first wireless link 310. In further examples, processing associated with the photo-detector creates received light data that characterizes the time sequence of light intensity detected by the photo-detector, and that processor sends the characterizing received light data to a processor performing the beacon identification and image augmenting process 500. In one example, the photo-detector is coupled to a code division multiple access receiver that processes received light intensity data and determines which spectrum spreading multiple access codes are being received. That processor sends received light data that includes identifications of the spectrum spreading multiple access codes that are received.

The beacon identification and image augmenting process 500 processes, at 504, the time sequence of detected light intensity data to determine beacon identification data and emitted data within the view. In one example, the view is the view of the ambient images that are able to be viewed by a user of an augmented reality device, such as an image augmenting headset 122 described above. As described above, beacons that include light emitters configured to emit pulses of light are able to be located in a scene that a viewer views through an augmented reality device. Processing the time sequence of detected light intensity is used in some examples to determine respective beacon identification data for each beacon. The beacons that are within the present view of the image augmenting device are identified based upon these determined respective identification data, as is described herein.

In one example, each beacon is configured to transmit an assigned multiple access spectrum spreading code, such as a Code Division, Multiple Access (CDMA) code that allows multiple beacons to simultaneously transmit identification signals that can all be received and detected by a receiver. In one example, a light receiver within the image augmenting headset 302 identifies the CDMA codes modulated onto light emitted by beacons whose light transmissions are received, and conveys this information to a processor within the electronic device 304. Receiving CDMA code identifications is an example of determining respective beacon identification data based upon the time sequence of light intensity data. In further examples, a time sequence of light intensity data detected by a light intensity detector of the image augmenting headset 302 includes time samples of detected light intensities that are communicated to the processor of the electronic device 304 for processing to determine respective beacon identification data.

In one example, the multiple access spectrum spreading code, such as a CDMA code, transmitted by a beacon is itself able to serve as augmenting image identification data. In some examples, a particular identifier, such as an identification number, alphanumeric string, or other data, is able to be associated with each multiple access spectrum spreading code. This identifier is determined by a processor based upon the detected multiple access spectrum spreading code transmitted by a particular beacon.

The beacon identification and image augmenting process 500 retrieves, at 506, augmenting images associated with identified beacons. In one example, the augmenting images are retrieved based upon the augmenting image identification data received from the identified beacons. The augmenting image identification data is able to be determined based upon several techniques that are used to identify the light signals emitted by the beacons, covey augmenting image identification data on light emitted by the beacons, or both. As described above, augmenting image identification data is able to be determined based upon the spectrum spreading multiple access code modulated onto the light emitted by the beacon.

In further examples, one or more data blocks are able to be encoded onto the light emitted by the beacon by, for example, incorporating the data block onto the spectrum spreading multiple access code used by the beacon. In one example, a data block that specifies the augmenting image identification data includes an address from which to retrieve the at least one augmenting image. A processor is retrieves the augmenting image by sending a query to the address specified in the data block encoded into the light transmitted by the beacon. In one example a processor performing the beacon identification and image augmenting process 500 is able to be configured with an image augmentation device identification. The image augmentation device identification is further able to be sent to the specified address prior to retrieving the augmenting image data. For example, the address may include a URL and the image augmentation device identification is able to be combined with the URL when retrieving the augmenting image.

The determined beacon identifiers are stored, at 508. Storing the determined beacon identifiers creates a time sequence of determined beacon identifiers that are used to associate a particular beacon identifier with an image of a beacon in a captured image. As described below, the determined beacon identifiers are combined with beacon images that are determined in captured images to determine beacons that are "blanked." Beacons that are blanked are not emitting light and will not appear in captured images or have identifiers that appear in the time sequence of detected light intensity. Noting the concurrent absence of a beacon's image and identification in both the captured image and the time sequence of detected light intensity is used in some examples to associate a particular beacon identifier with a particular beacon image location in a time sequence of captured images.

The beacon identification and image augmenting process 500 captures and stores, at 510, an image of the view. The captured image in general is an image that contains at least the view of the ambient image that a user sees when looking through an image augmenting device. Each captured image includes images of objects within that view of the ambient image. Each captured image is captured at a detection time that is associated with the captured image. The stored images of the view create a time sequence of captured images of objects within the view of an image augmentation system. Images of beacons within this time sequence of captured images are analyzed to identify beacons that are absent within the time sequence in order to identify blanked beacons.

The beacon identification and image augmenting process 500 identifies, at 512, locations of beacons in images within the captured images. In one example, the beacons include light emitters that emit pulses of light that cycle on and off at a rate that is faster than the shutter speed of the image capturing device that captures the image. Capturing images that include beacons that flash light pulses at a rate much faster than the shutter speed of an image capturing device causes the captured images to include images of the light emitters when they are emitting light.

The beacon identification and image augmenting process 500 compares, at 514, beacon image locations in previously captured images to the last captured image to identify beacon images that are no longer present in the captured image. In one example, the beacons that are physically placed in the scenes that are able to be viewed by an image augmentation device are configured to "blank" and not emit light for a period that is longer than an anticipated period between captured images. When the comparison of the previously stored images to the last captured image identifies a particular beacon image that is not present in the last captured image, the processing determines the absence of the image of that beacon and determines that the beacon associated with the absent image as being "blanked" and not emitting light. The beacon identification data determined by processing the time sequence of detected light intensity data will also not include the beacon identification data for the "blanked" beacon since it is not emitting light.

The beacon identification and image augmenting process 500 determines, at 516, if a beacon is "blanked." In one example, the beacons are configured to not emit light for a time duration that is longer than an anticipated period between capturing of images by an image augmentation device. In this discussion, the beacon is said to be "blanked" during this extended time of not emitting light. The absence of a beacon image, which includes the image of the light emitters of the beacon, in a captured image is able to be the result of the beacon being "blanked" during the time when that image is captured. In the case of an image of a particular beacon being absent from a most recently captured image as compared to previously captured images, that beacon is determined to be "blanked" at the detection time for that image. In further examples, any sequence of images are able to be analyzed to determine images that have a blanked beacon, such processing is not limited to identifying blanked beacons in the most recently captured image.

When a beacon is determined to be "blanked," the beacon identification and image augmenting process 500 determines, at 518, an absence of beacon identification data that is determined from processing the time sequence of detected light intensities. In a time period during which a beacon is "blanked" and not emitting light, the time sequence of detected light intensities will not include the identification emitted by that beacon. Association between a beacon image and a particular beacon identification data is based upon a determination that previously present beacon identification data is absent at a detection time of an image in which an image of a beacon is also absent.

Continuing with the condition of the beacon having been determined to be "blanked," the beacon identification and image augmenting process 500 associates, at 520, the beacon identification data for the beacon that is missing from the determined beacon identifiers, i.e., the beacon whose absence was determined above, with the beacon associated with the missing beacon image in the most recently captured image. The image of the beacon will not be in the most recently captured image because the beacon is blanked. The processing of one example associates received beacon identification data with images of beacons in captured images by correlating the simultaneous absence of observations of both the detected pulsed light identification data and the image of the beacon in a captured image.

The beacon identification and image augmenting process 500 generates, at 521, an augmenting image to be provided for insertion into the ambient view. In various examples, the ambient image is generated by being retrieved an image or other information defining the image from a location indicated by data modulated onto the light emitted by the beacon. In various examples, a processor is able to create images based on various criteria.

In some examples, beacons emit light that is modulated to convey data that simply identifies the beacon or provides information associated with the beacon. For example, a beacon identification number, alphanumeric data, name, other data, or combinations of those are able to be modulated onto the light emitted by the beacon. Based on this identification data, a processor is able to be configured to generate an image by, for example, retrieving an image or data, creating an image, modifying an image, other performing processes, or combinations of those. In further examples, the beacons are able to emit light that is modulated to convey beacon related data that indicates, for example, geographical location of the beacon such as its latitude and longitude, the altitude of the beacon, temperature of the beacon's surroundings, other data, or combinations of these. In examples where beacons emit light that conveys such beacon related data, a processor is able to generate images based upon that beacon data. In one example, data such as ambient temperature, item pricing information of a product near the beacon, other data, or combinations of these data, are able to be incorporated into augmenting images that are to be created or generated and added to the ambient scene near the beacon.

The beacon identification and image augmenting process 500 determines, at 522, a respective location and orientation for augmenting images in the view of the ambient image presented to a user of the image augmenting device. In one example, augmenting images are superimposed upon an ambient image at locations within the ambient image that are determined based upon the detected locations of the image of the corresponding beacon for that image. A corresponding beacon for an image is a beacon associated with the image. The orientation of the augmenting image is also able to be modified based upon an orientation of the beacon as determined by analysis of beacon images in captured images of the ambient view. For examples, processing of captured images of beacons that have three or more light emitters that are positioned on the body of the beacon is able to determine the physical orientation of the beacon relative to the image capturing device. In examples of beacons with one light emitter, such orientation information may not be able to be determined, and the augmenting image will be added based upon the determination of the location of the image of the beacon.

In one example, each beacon emits a time sequence of light pulses that conveys information to identify an augmenting image that is to be placed at the location of the image of that beacon, or at a location based upon the location of the image of that beacon. In one example, the augmenting images are superimposed at the location of the image of the corresponding beacon, which is the beacon that emits light encoded with an identification of that image. In other examples, the augmenting image is superimposed at a location removed from the image of the corresponding beacon. A location at which an augmenting image is to be placed into an ambient image is able to be specified by, for example, data contained metadata stored with the augmenting identification information emitted by the beacon, as metadata stored with the augmentation data, such as at a URL specified by the augmentation identification information emitted by the beacon, by data modulated onto the light emitted by the beacon, combinations of these, or other by other means.

Modification of the orientation of the augmenting image in one example includes transforming the image to synthesize a different view angle for the augmenting image, e.g., by creating a representation of objects within the augmenting image that cause those objects to appear to be viewed from a different view angle than the angle from which those objects are viewed in the original augmenting image. The orientation of the augmenting image is able to be modified based upon, for example, a determined orientation of an associated beacon relative to the view of the ambient image presented to the user.

In one example, the beacons that are placed in an ambient scene have three or more light emitters disposed on their respective bodies in a determined pattern. The orientation of a beacon relative to the view of the ambient image presented to the user is able to be determined by processing images of the ambient view, identifying an image of that beacon, and determining the geometric relationships between and among the light emitters on that beacon that is observed in those images. The orientation of the beacon relative to the view of the beacon in the ambient image is able to be determined by comparing the geometric relationship of the light emitters in an image of the beacon to the geometric relationship of the location of the light emitters on the body of the beacon. In one example, a processor that generates augmenting images stores data defining the location of light emitters on the body of the beacons used with that processor. In some examples, different types of beacons are able to be used where each type of beacon has light emitters located at different positions on the body of that type of beacon. In examples using such different types of beacons, a description of the physical configuration of light emitters on the body of each type of beacon is stored in the processor or otherwise available to the processor. In one example, data encoded onto the light emitted by the beacon is able to identify the type of beacon emitting the light, and, images of the beacon is able to be compared to the description of the physical configuration of the light emitters on the type of beacon identified by the data encoded onto the emitted light in order to determine the orientation of that beacon with regards to the image capturing device.

The beacon identification and image augmenting process 500 provides, at 524, the respective augmenting images for insertion into the user's view of the ambient scene at the determined location. In one example, the respective augmenting images are sent to the above described image augmenting headset 302 along with a specification of the location at which the image is to be inserted. The respective augmenting images are able to be retrieved from an information server based upon augmentation identification data emitted by the beacon, as is described above. In further examples, the augmenting images are able to be generated by a processor performing the beacon identification and image augmenting process 500 based upon various criteria. The augmenting image is able to include, for example, a movie, textual data, graphical data, still images, any other type of data, or combinations of these. The beacon identification and image augmenting process 500 then returns to receiving, at 502, a time sequence of detected light intensity data as is described above.

Figure 6:
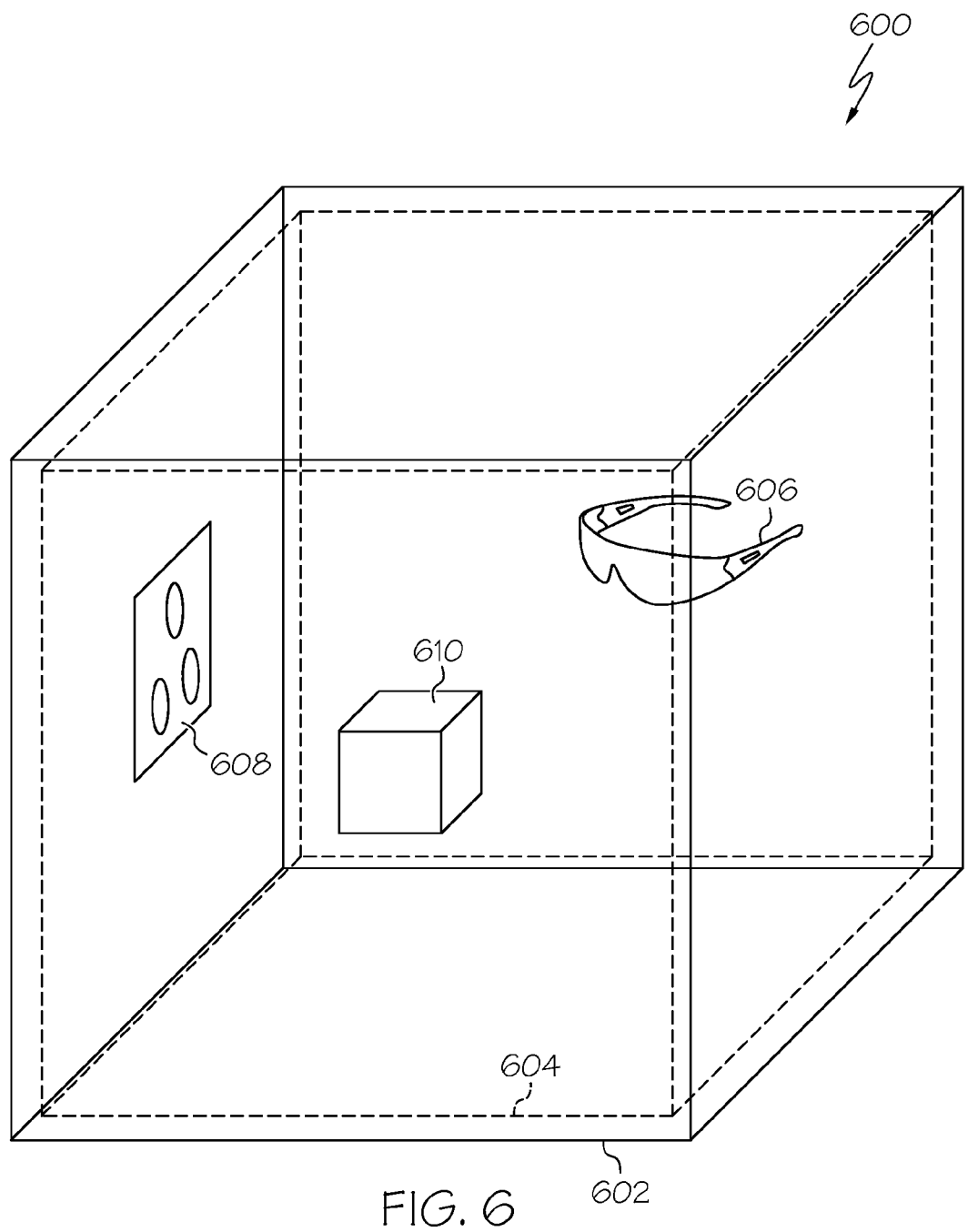
FIG. 6 is a single beacon augmented reality environment, according to one example.

FIG. 6 is a single beacon augmented reality environment 600, according to one example. The single beacon augmented reality environment 600 illustrates a real space 602 that is an ambient scene in this example. A pair of augmented reality glasses 606 is also shown within the real space 602. The illustrated augmented reality glasses 606 are an example of an image augmentation headset that is similar to the image augmentation headsets described above. In one example, the augmented reality glasses 606 allow a wearer or user to view images of the real space 602 or ambient scene through lenses or other apertures.

The real space 602 is shown to have a beacon 608. The beacon 608 is used in one example to define a fixed point in the real space 602 in order to precisely align augmenting images that are inserted into views of the real space 602. The illustrated beacon 608 is shown to have three light emitters. Captured images of the real space 602 are able to be analyzed or processed to identify images of the three emitters of the beacon 608. Based upon an analysis of the location of the images of these light emitters, the location of the beacon 608 relative to the augmented reality glasses 606, and its orientation relative to a line of slight from the augmented reality glasses 606 to the beacon 608, is able to be determined. The orientation of the beacon 608 relative to a line of slight from the augmented reality glasses 606 is able to be determined in one example based upon an analysis of the geometry between images of the three light emitters in the captured image and the physical location of the light emitters on the body of the beacon 608 in combination with descriptions of the location of the light emitters on the beacon 608 that are stored by or available to the processor performing the image analysis.

The augmented reality space 604 is a scene or image that is viewed by a wearer or user of the augmented reality glasses 606. The augmented reality glasses 606 in one example create the augmented reality space 604 of this example by inserting an image of a virtual object 610 into a view of the real space 602 that is viewed by a wearer of the augmented reality glasses 606. The image of the virtual object 610 is an example of an augmenting image, as is described above. The image of the virtual object is inserted into the augmented reality space 604, as viewed through the augmented reality glasses 606, at a location that is based upon a determination of the location of the beacon 608 relative to the augmented reality glasses 606.

The image of the virtual object 610 is generated based upon data modulated onto the light emitted by the beacon 608. As described above, the light emitted by the beacon 608 is able to be modulated to convey data that indicates image data that defines the virtual object 610. In one example, the data conveyed by the modulated light emitted by beacon 608 is an address, such as a Universal Resource Locator (URL) that specifies a data storage location or other data communications location or address from which image data is to be retrieved and inserted into the augmented reality space 604. The virtual object 610 is able to be generated in any suitable manner either based upon data emitted by the beacon 608 or independently of that data.

The apparent physical location at which the virtual object 610 is inserted into the augmented reality space 604 is based on the location of the beacon 608 and also able to be based upon location offset information associated with the virtual object 610. In one example, the data conveyed by the modulated light emitted by the beacon 608 is able to directly include a location offset specification, which is a specification of the apparent physical location at which the virtual object 610 is to be inserted into the augmented reality space 604 relative to the location of the beacon 608. In another example, the retrieved image data defining the virtual object 610 is able to include the location offset specification, such as in the form of metadata associated with an image of the virtual object 610.

Examples of a virtual object 610 that is able to be inserted into the augmented reality space 604 include a virtual two-dimensional object or image that displays a web page or other data, a large advertising panel that is displayed in front of a building or other large structure in the real space 602, a three-dimensional object in particular setting near the beacon 608, such as in a store, any other type of image, or combinations of these.

The above described examples are able to include various components and perform processes or methods that include various steps. For example, an augmenting image generation processor is able to be configured to determine, based upon received light data, a respective beacon identification data for at least one beacon; receive, from the image capturing device configured to capture images of objects within a view angle, a time sequence of images of objects within the view angle; determine, based upon the time sequence of images, an absence of an image of a first beacon within one image in the time sequence of images, the one image being captured at a detection time; determine an absence of a determined beacon identification data during the detection time within the received light data; associate, based on a determination of the absence of the image and the absence of the determined beacon identification data, the determined beacon identification data with the first beacon; and provide at least one augmenting image for insertion at a location within an ambient image, the location being based upon a location of the image of the first beacon within the one image in the time sequence of images.

In other examples, the augmenting image generation processor is configured such that the received light data comprises a time sequence of light intensity data, and a processor is further configured to: receive the time sequence of light intensity data detected by a light intensity detector that is configured to detect light intensity received from within a view angle; and determine, based upon the time sequence of light intensity data, the respective beacon identification data. The augmenting image generation processor is also able to be configured to determine the respective beacon identification data by determining at least one respective multiple access spectrum spreading code within the time sequence of light intensity data.

The augmenting image generation processor is also able to comprising a short range wireless data communications component, communicatively coupled to the processor, the short range wireless data communications component configured to exchange data with the image capturing device and a light intensity detector configured to determine the received light data. An augmenting image used by the augmenting image generation processor is able to comprise at least one of an image, a video, textual information and graphical information.

The augmenting image generation processor can have a processor is further configured to: determine, based upon the received light data, an augmenting image identification that is associated with the first beacon; and retrieve, based on the augmenting image identification, the at least one augmenting image.

In another example, light emitting beacon comprises: a body; at least one light emitter physically configured in a defined pattern on the body, each light emitter of the at least one light emitter configured to emit light at a first intensity level and a second intensity level; a controller, communicatively coupled to each light emitter of the at least one light emitter, configured to: drive the at least one light emitter to emit light at the first intensity level for a first plurality of time intervals; drive the at least one light emitter to emit light at the second intensity level for a second plurality of time intervals, wherein the first plurality of time intervals are interleaved with the second plurality of time intervals, and wherein a respective duration of each time interval in the first plurality of time intervals and a respective duration of each time interval in the second plurality of time intervals corresponds to the at least one light emitter emitting a defined multiple access spectrum spreading code; and drive the least one light emitter to emit light at a blanking intensity level during a blanking time interval, the blanking time interval corresponding to a defined time interval and being separate from any time interval in the first plurality of time intervals and the second plurality of time intervals.

In further examples, the light emitting beacon has a blanking time interval that corresponds to a time interval between image captures of an image augmenting device. Also the respective duration of each time interval in the first plurality of time intervals and the respective duration of each time interval in the second plurality of time intervals further corresponds to data encoded onto the multiple access spectrum spreading code, the data comprising augmenting image identification. In one example, the light emitting beacon has the at least one light emitter comprising at least three light emitters arranged in a triangular pattern on the body.

In further examples, methods or processes include the processing for which the above devices are configured.

Figure 7:
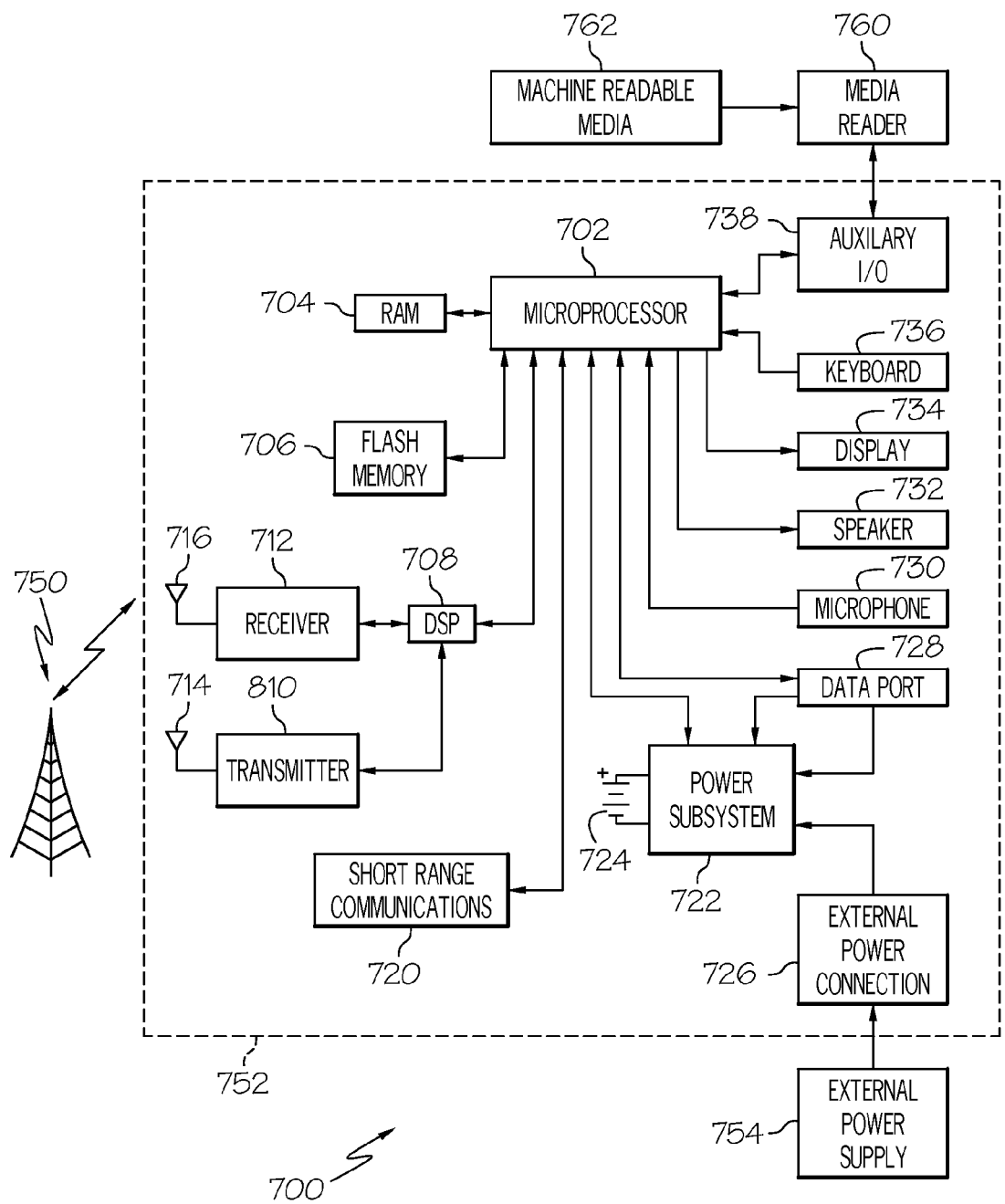
FIG. 7 is a block diagram of an electronic device and associated components in which the systems and methods disclosed herein may be implemented.

FIG. 7 is a block diagram of an electronic device and associated components 700 in which the systems and methods disclosed herein may be implemented. In this example, an electronic device 752 is also a wireless two-way communication device with voice and data communication capabilities. Such electronic devices communicate with a wireless voice or data network 750 using a suitable wireless communications protocol. Wireless voice communications are performed using either an analog or digital wireless communication channel. Data communications allow the electronic device 752 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities. The electronic device 304 described above is an example of the electronic device 752.

The illustrated electronic device 752 is an example electronic device that includes two-way wireless communications functions. Such electronic devices incorporate communication subsystem elements such as a wireless transmitter 710, a wireless receiver 712, and associated components such as one or more antenna elements 714 and 716. A digital signal processor (DSP) 708 performs processing to extract data from received wireless signals and to generate signals to be transmitted. The particular design of the communication subsystem is dependent upon the communication network and associated wireless communications protocols with which the device is intended to operate.

The electronic device 752 includes a microprocessor 702 that controls the overall operation of the electronic device 752. The microprocessor 702 interacts with the above described communications subsystem elements and also interacts with other device subsystems such as flash memory 706, random access memory (RAM) 704, auxiliary input/output (I/O) device 738, data port 728, display 734, keyboard 736, speaker 732, microphone 730, a short-range communications subsystem 720, a power subsystem 722, a camera 770, a projector 772, other subsystems, or combinations of these.

One or more power storage or supply elements, such as a battery 724, are connected to a power subsystem 722 to provide power to the circuits of the electronic device 752. The power subsystem 722 includes power distribution circuitry for providing power to the electronic device 752 and also contains battery charging circuitry to manage recharging the battery 724 (or circuitry to replenish power to another power storage element). The power subsystem 722 receives electrical power from external power supply 754. The power subsystem 722 is able to be connected to the external power supply 754 through a dedicated external power connector (not shown) or through power connections within the data port 728. The power subsystem 722 includes a battery monitoring circuit that is operable to provide a status of one or more battery status indicators, such as remaining capacity, temperature, voltage, electrical current consumption, and the like, to various components of the electronic device 752.

Data communication through data port 728 enables a user to set preferences through the external device or through a software application and extends the capabilities of the device by enabling information or software exchange through direct connections between the electronic device 752 and external data sources rather then via a wireless data communication network. In addition to data communication, the data port 728 provides power to the power subsystem 722 to charge the battery 724 or to supply power to the electronic circuits, such as microprocessor 702, of the electronic device 752.

Operating system software used by the microprocessor 702 is stored in flash memory 706. Further examples are able to use a battery backed-up RAM or other non-volatile storage data elements to store operating systems, other executable programs, or both. The operating system software, device application software, or parts thereof, are able to be temporarily loaded into volatile data storage such as RAM 704. Data received via wireless communication signals or through wired communications are also able to be stored to RAM 704.

The microprocessor 702, in addition to its operating system functions, is able to execute software applications on the electronic device 752. A set of applications that control basic device operations, including at least data and voice communication applications, is able to be installed on the electronic device 752 during manufacture. Examples of applications that are able to be loaded onto the device may be a personal information manager (PIM) application having the ability to organize and manage data items relating to the device user, such as, but not limited to, e-mail, calendar events, voice mails, appointments, and task items. The microprocessor 702 is further able to perform part or all of the above described processing, such as the beacon identification and image augmenting process 500.

Further applications may also be loaded onto the electronic device 752 through, for example, the wireless network 750, an auxiliary I/O device 738, Data port 728, short-range communications subsystem 720, or any combination of these interfaces. Such applications are then able to be installed by a user in the RAM 704 or a non-volatile store for execution by the microprocessor 702.

In a data communication mode, a received signal such as a text message or web page download is processed by the communication subsystem, including wireless receiver 712 and wireless transmitter 710, and communicated data is provided the microprocessor 702, which is able to further process the received data for output to the display 734, or alternatively, to an auxiliary I/O device 738 or the Data port 728. A user of the electronic device 752 may also compose data items, such as e-mail messages, using the keyboard 736, which is able to include a complete alphanumeric keyboard or a telephone-type keypad, in conjunction with the display 734 and possibly an auxiliary I/O device 738. Such composed items are then able to be transmitted over a communication network through the communication subsystem.

For voice communications, overall operation of the electronic device 752 is substantially similar, except that received signals are generally provided to a speaker 732 and signals for transmission are generally produced by a microphone 730. Alternative voice or audio I/O subsystems, such as a voice message recording subsystem, may also be implemented on the electronic device 752. Although voice or audio signal output is generally accomplished primarily through the speaker 732, the display 734 may also be used to provide an indication of the identity of a calling party, the duration of a voice call, or other voice call related information, for example.

Depending on conditions or statuses of the electronic device 752, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 720 in one example is a short range wireless data communications component that provides data communication between the electronic device 752 and different systems or devices, which need not necessarily be similar devices. For example, the short-range communications subsystem 720 includes an infrared device and associated circuits and components or a Radio Frequency based communication module such as one supporting Bluetooth® communications, to provide for communication with similarly-enabled systems and devices, including the data file transfer communications described above. The short range communications subsystem 720 is able to communicate with, for example, the above described image augmenting headset 302 to exchange, for example, a light intensity detector such as the light sensor 324, and the image capturing device, such as camera 326.

A media reader 760 is able to be connected to an auxiliary I/O device 738 to allow, for example, loading computer readable program code of a computer program product into the electronic device 752 for storage into flash memory 706. One example of a media reader 760 is an optical drive such as a CD/DVD drive, which may be used to store data to and read data from a computer readable medium or storage product such as computer readable storage media 762. Examples of suitable computer readable storage media include optical storage media such as a CD or DVD, magnetic media, or any other suitable data storage device. Media reader 760 is alternatively able to be connected to the electronic device through the Data port 728 or computer readable program code is alternatively able to be provided to the electronic device 752 through the wireless network 750.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. An augmenting image generation processor, comprising:
    a processor configured to:
        determine, based upon received light data, a respective beacon identification data for at least one beacon, the respective beacon identification data identifying a respective beacon, transmission of each respective beacon identification data lasting at least for an identification data transmission duration, the respective beacon identification data comprising a plurality of data symbols with each data symbol being transmitted for a symbol duration, the respective beacon identification data comprising, for at least one capture time interval, a determined beacon identification data;
        receive, from an image capturing device configured to capture images of objects within a view angle, a time sequence of images of objects within the view angle, at least one image in the time sequence of images comprising an image of a first beacon captured over at least a plurality of data symbol durations during the capture time interval;
        detect an absence, for an entire detection time duration that occurs outside of the at least one capture time interval, of the determined beacon identification data within the received light data, where the detection time duration being at least as long as the identification data transmission duration;

determine, based upon the time sequence of images, an absence of an image of the first beacon within at least one image in the time sequence of images, the at least one image being captured during the detection time duration;

associate the determined beacon identification data with the first beacon based on:
the detection of the absence, for the entire detection time duration, of the determined beacon identification data, and
the determination of the absence of the image of the first beacon within the at least one image captured during the detection time duration; and provide at least one augmenting image for insertion at a location within an ambient image, the location being based upon a location of the image of the first beacon within the one image in the time sequence of images.

2. The augmenting image generation processor of claim 1, wherein the received light data comprises a time sequence of light intensity data values, each light intensity data value within the time sequence of light intensity data values indicating a respective total intensity of light received from within the view angle during a respective capture time, and wherein the processor is further configured to:
receive the time sequence of light intensity data values detected by a light intensity detector that is configured to detect light intensity received from within the view angle of images captured by the image capturing device and produce a respective value indicating light intensity received from within the view angle during a respective capture time; and
determine, based upon the time sequence of light intensity data values, the respective beacon identification data.

3. The augmenting image generation processor of claim 2, wherein the processor is configured to determine the respective beacon identification data by determining at least one respective multiple access spectrum spreading code within the time sequence of light intensity data values, the multiple access spectrum spreading code comprising a code division, multiple access (CDMA) spectrum spreading code modulated onto emitted light.

4. The augmenting image generation processor of claim 1, further comprising a short range wireless data communications component, communicatively coupled to the processor, the short range wireless data communications component configured to exchange data with the image capturing device and a light intensity detector configured to determine the received light data.

5. The augmenting image generation processor of claim 1, wherein the processor is further configured to:
determine, based upon the received light data, an augmenting image identification that is associated with the first beacon; and
retrieve, based on the augmenting image identification, the at least one augmenting image.

6. The augmenting image generation processor of claim 1, wherein the received light data comprises a time sequence of light intensity data values, each light intensity data value within the time sequence of light intensity data values indicating a respective total intensity of light received from within the view angle during a respective capture time, and wherein the processor is further configured to:
receive the time sequence of light intensity data values detected by a light intensity detector that is configured to detect light intensity received from within view angle of images captured by the image capturing device and produce a respective value indicating light intensity received from within the view angle during a respective capture time;
determine the respective beacon identification data for the first beacon by determining a multiple access spectrum spreading code associated with the first beacon within the time sequence of light intensity data values, the multiple access spectrum spreading code comprising a code division, multiple access (CDMA) spectrum spreading code modulated onto emitted light;
determine an augmenting image identification based on detecting data encoded within the multiple access spectrum spreading code associated with the first beacon; and
retrieve, based on the augmenting image identification, the at least one augmenting image.

7. The augmenting image generation processor of claim 1, wherein the processor is further configured to:
determine, based upon the received light data, an augmenting image identification that is associated with the first beacon, the augmenting image identification comprising an address from which to retrieve the at least one augmenting image;
send to the address, prior to the retrieving, an image augmentation device identification associated with a device inserting the at least one augmenting image into the ambient; and
retrieve the at least one augmenting image based on the sending the image augmentation device identification.

8. The augmenting image generation processor of claim 7, wherein the augmenting image identification comprises a universal resource locator, and
wherein the processor is configured to retrieve the at least one augmenting image by submitting a query based upon a combination of the universal resource locator and the image augmentation device identification.

9. The augmenting image generation processor of claim 1, wherein the image capturing device comprises a image capturing device with a view angle capturing a plurality of beacons that are captured separately within the at least one image of the time sequence of images of objects, and
wherein the received light data is received from a light detector that is separate from the image capturing device, the light detector being configured to receive light over all of the view angle.

10. A light emitting beacon, comprising:
a body;
at least one light emitter physically configured in a defined pattern on the body, each light emitter of the at least one light emitter configured to emit light at a first intensity level and a second intensity level;
a controller, communicatively coupled to each light emitter of the at least one light emitter, configured to:
drive the at least one light emitter to emit light at the first intensity level for a first plurality of time intervals;
drive the at least one light emitter to emit light at the second intensity level for a second plurality of time intervals,
wherein the first plurality of time intervals are interleaved with the second plurality of time intervals, and wherein a respective duration of each time interval in the first plurality of time intervals and a respective duration of each time interval in the second plurality of time intervals corresponds to the at least one light emitter emitting a defined multiple access spectrum spreading code, and wherein at least a beacon identifier is encoded onto the emitted light and transmission of the beacon identifier occurring for an identifier transmission time duration that is at least a sum of the first plurality of time intervals and the second plurality of time intervals; and drive the at least one light emitter to emit light at a blanking intensity level during an entirety of a blanking time duration, the blanking time duration being at least as long as the identifier transmission time duration of the beacon identifier and corresponding to a defined time duration and being separate from any time interval in the first plurality of time intervals and the second plurality of time intervals.

11. The light emitting beacon of claim 10, wherein the blanking time duration is greater than the identifier transmission time duration and greater than a time interval between image captures of an image augmenting device.

12. The light emitting beacon of claim 10, wherein the respective duration of each time interval in the first plurality of time intervals and the respective duration of each time interval in the second plurality of time intervals further corresponds to data encoded onto the multiple access spectrum spreading code, the data comprising augmenting image identification.

13. The light emitting beacon of claim 10, wherein the at least one light emitter comprises at least three light emitters arranged in a triangular pattern on the body.

14. A method for augmenting an image, the method comprising:

determining, based upon received light data, a respective beacon identification data for at least one beacon, the respective beacon identification data identifying a respective beacon, transmission of each respective beacon identification data lasting at least for an identification data transmission duration, the respective beacon identification data comprising a plurality of data symbols with each data symbol being transmitted for a symbol duration, the respective beacon identification data comprising, for at least one capture time interval, a determined beacon identification data;

receiving, from an image capturing device configured to capture images of objects within a view angle, a time sequence of images of objects within the view angle, at least one image in the time sequence of images comprising an image of a first beacon captured over at least a plurality of data symbol durations during the capture time interval;

detecting an absence, for an entire detection time duration that occurs outside of the at least one capture time interval, of the determined beacon identification data within the received light data, where the detection time duration being at least as long as the identification data transmission duration;

determining, based upon the time sequence of images, an absence of an image of the first beacon within at least one image in the time sequence of images, the at least one image being captured during the detection time duration;

associating the determined beacon identification data with the first beacon based on:

detecting the absence, for the entire detection time duration, of the determined beacon identification data, and determining the absence of the image of the first beacon within the at least one image captured during the detection time duration; and providing at least one augmenting image for insertion at a location within an ambient image, the location being based upon a location of the image of the first beacon within the one image in the time sequence of images.

15. The method of claim 14, wherein the received light data comprises a time sequence of light intensity data values, each light intensity data value within the time sequence of light intensity data values indicating a respective total intensity of light received from within the view angle during a respective capture time, and the method further comprising:

receiving the time sequence of light intensity data values detected by a light intensity detector that is configured to detect light intensity received from within the view angle of images captured by the image capturing device and produce a respective value indicating light intensity received from within the view angle during a respective capture time; and determining, based upon the time sequence of light intensity data values, the respective beacon identification data.

16. The method of claim 15, the determining the respective beacon identification data comprising determining at least one respective multiple access spectrum spreading code within the time sequence of light intensity data values, the multiple access spectrum spreading code comprising a code division, multiple access (CDMA) spectrum spreading code modulated onto emitted light.

17. The method of claim 14, wherein the received light data comprises a time sequence of light intensity data values, each light intensity data value within the time sequence of light intensity data values indicating a respective total intensity of light received from within the view angle during a respective capture time, and the method further comprising:

receiving the time sequence of light intensity data detected by a light intensity detector that is configured to detect light intensity received from within view angle of images captured by the image capturing device and produce a respective value indicating light intensity received from within the view angle during a respective capture time;

determining the respective beacon identification data for the first beacon by determining a multiple access spectrum spreading code associated with the first beacon within the time sequence of light intensity data values, the multiple access spectrum spreading code comprising a code division, multiple access (CDMA) spectrum spreading code modulated onto emitted light;

determining an augmenting image identification based on detecting data encoded within the multiple access spectrum spreading code associated with the first beacon; and retrieving, based on the augmenting image identification, the at least one augmenting image.

18. A method of driving light emitters on a light emitting beacon, the method comprising:

driving at least one light emitter that is physically configured in a defined pattern on a body to emit light at a first intensity level for a first plurality of time intervals;

driving the at least one light emitter to emit light at a second intensity level for a second plurality of time intervals, wherein the first plurality of time intervals are interleaved with the second plurality of time intervals, and wherein a respective duration of each time interval in the first plurality of time intervals and a respective duration of each time interval in the second plurality of time intervals corresponds to the at least one light emitter emitting a defined multiple access spectrum spreading code, and wherein at least a beacon identifier is encoded onto the emitted light and transmitted for an identifier transmission time duration that is at least a sum of the first plurality of time intervals and the second plurality of time intervals; and driving the at least one light emitter to emit light at a blanking intensity level during an entirety of a blanking time duration; the blanking time duration being at least as long as the identifier transmission time duration of the beacon identifier and corresponding to a defined time duration and being separate from any time interval in the first plurality of time intervals and the second plurality of time intervals.

19. The method of claim 18, wherein the blanking time duration is greater than the identifier transmission time duration and greater than a time interval between image captures of an image augmenting device.

20. The method of claim 18, wherein the respective duration of each time interval in the first plurality of time intervals and the respective duration of each time interval in the second plurality of time intervals further corresponds to data encoded onto the multiple access spectrum spreading code, the data comprising augmenting image identification.

21. The augmenting image generation processor of claim 1, wherein at least some images in the time sequence of images capture at least part of the ambient image and the image of the first beacon, and wherein the location of insertion of the at least one augmenting image into the ambient image is based upon a location the image of the first beacon within the one image in the time sequence of images.

* * * * *